(12) United States Patent
Hosono (10) Patent No.: US 8,638,718 B2
(45) Date of Patent: Jan. 28, 2014

(54) RADIO BASE TRANSCEIVER STATION AND METHOD OF CONNECTING THE SAME TO NETWORK

(75) Inventor: Hiroyuki Hosono, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 812 days.

(21) Appl. No.: 12/864,467

(22) PCT Filed: Jan. 26, 2009

(86) PCT No.: PCT/JP2009/051222
§ 371 (c)(1),
(2), (4) Date: Jul. 23, 2010

(87) PCT Pub. No.: WO2009/093733
PCT Pub. Date: Jul. 30, 2009

(65) Prior Publication Data
US 2010/0296457 A1    Nov. 25, 2010

(30) Foreign Application Priority Data

Jan. 24, 2008  (JP) ................................ 2008-013821

(51) Int. Cl.
*H04W 88/08*       (2009.01)
(52) U.S. Cl.
USPC ........................................................ 370/328
(58) Field of Classification Search
USPC ................................................. 370/329, 328
See application file for complete search history.

(56) References Cited

U.S. PATENT DOCUMENTS

2008/0220768 A1*  9/2008  Bose et al. ................. 455/426.1

FOREIGN PATENT DOCUMENTS

JP         2006 324831 A    11/2006
WO    WO 2007/015066 A2     2/2007

OTHER PUBLICATIONS

PCT/JP2009/051222 PCT/IB/338.
PCT/JP2009/051222 PCT/IB/373.
PCT/JP2009/051222 PCT/ISA/237 (English Translation).
Orange, et al, "Requirements for the Home eNodeB Deployment", 3GPP Draft; R3-070297, $3^{rd}$ Generation Partnership Project (3GPP) Mobile Competence Centre; 650, Route Des Lucioles; F-06921 Sophia-Antipolis Cedex; France, vol. RAN WG3, St. Louis Missouri; 20070208, Feb. 8, 2007, 4 pages, XP050161208.

(Continued)

*Primary Examiner* — Sulaiman Nooristany
(74) *Attorney, Agent, or Firm* — Crowell & Moring LLP (57) ABSTRACT

There are provided a radio base transceiver station and a method of connecting the same to a network, whereby a home radio base transceiver station is connectable in an automated manner to a network (network) of a mobile communications operator and the security is ensured in the reception of information. A network interface section 201 that transmits and receives various types of information with the network of the mobile communications operator; a mobile communications operator identifying section 202 that identifies an authorized mobile communications operator; a VPN (Virtual Private Network) setting section 203 that sets up a VPN with a network of the authorized mobile communications operator; an installation location recognizing section 204 that recognizes an installation location of the radio base transceiver station; a surrounding environment recognizing section 205 that recognizes a surrounding environment; a recognition result notifying section 206 that notifies theses recognition results to the network; and a connection setting section 207 that connects the radio base transceiver station to an upper node and sets up an operation parameter based upon configuration data supplied from the network.

6 Claims, 3 Drawing Sheets

(56) References Cited

OTHER PUBLICATIONS

Huawei, "Considerations on HNB architecture", 3GPP Draft; R3-071467 Considerations on HNB Architecture, 3rd Generation Partnership Project (3GPP), Mobile Competence Centre; 650, Route Des Lucioles; F-06921 Sophia-Antipolis Cedex; France, vol. RAN WG3, Athens, Greece, 20070815, Aug. 15, 2007, 5 pages, XP050162292.

Mitsubishi Electric, "Whereability of HNBs", 3GPP TSG SA WG5 and RAN WG3 LTE ADHOC, R3-071237, Jun. 14, 2007, 4 pages, XP008139358.

European Search Report, dated Jan. 7, 2013, 8 pages.

Orange, Telecom Italia, T-Mobile, Vodafone, "Requirements for LTE Home eNodeBs", 3GPP TSG RAN #35, RP-070209, Mar. 6-9, 2007, 4 pages, Lemesos, Cyprus.

Orange, Telecom Italia, T-Mobile, Vodafone, "Requirements for the Home eNodeB Deployment", 3GPP TSG RAN WG3#55, R3-070297, Feb. 12-16, 2007, 4 pages, St Louis, U.S.

Mitsubishi Electric, "Whereability of HNBs", 3GPP TSG SA WG5 and RAN WG3 LTE Adhoc, R3-071237, Jun. 13-14, 2007, 4 pages, Sophia-Antipolis, France.

Huawei, "Considerations on HNB architecture", 3GPP TSG RAN WG3 Meeting #57, R3-071467, Aug. 20-24, 2007, 5 pages, Athens, Greece.

Chinese Office Action (w/Translation), dated Jun. 19, 2012, 9 pages total.

* cited by examiner

RADIO BASE TRANSCEIVER STATION AND METHOD OF CONNECTING THE SAME TO NETWORK

TECHNICAL FIELD

The present invention relates to radio base transceiver stations operable in a network that is not under control of a mobile communications operator and methods of connecting the same to a network of a mobile communications operator.

BACKGROUND ART

Generally, in a case where a private radio communication device is connected to a network (network) of a mobile communications operator, a network administrator installs a radio base transceiver station and conducts necessary wiring works, and then switches on the power to open the line to an upper node.

Then, necessary parameters are set for the radio base transceiver station via the network or by the network administrator's manual direct operations.

For instance, information on frequencies and spreading codes that have been investigated, studied, and decided beforehand is input into a creating tool for creating data set stored in a station to create the data set. This data set is loaded onto a base station controller and the radio base transceiver station by means of a special communication path or memory medium. All of such operations are manually conducted in many cases.

Obviously, in order to create the data set stored in a station, the person who has expert knowledge conducts the operations, and in addition, dedicated measuring instruments are used in the process of the above installation operations.

After the device is installed and connected to the network as described above, the radio base transceiver station will continuously provide services as long as possible without interruption, except that restarting is required due to a failure, a change in the device configuration, or the like.

Conversely, in a case where such a radio base transceiver station is de-installed the operations for finishing the services of the radio base transceiver station are firstly conducted. Then, the power thereof is shut down and the wiring is released.

The above operations relating to the connection and disconnection of the radio base transceiver stations are not limited to the base transceiver stations for public lines, but substantially apply to those for radio base transceiver stations used for small-sized areas such as a house or the like, which are called home base transceiver station (Home eNodeB) (for example, see Non-Patent Document 1)

As described above, since there are too various cases for the connection and disconnection of the radio base transceiver stations, spread thereof to the public is hindered.

Focusing the attention on the above circumstances, there is a proposal for automating the operations of connecting a small-sized radio base transceiver station to be used at, for example, a personal residence (home base transceiver station) to a mobile communications network (for example, see Patent Document 1).

Patent Document 1 discloses as follows. Identification information such as a telephone number or the like of a mobile station to be connected to a home radio base transceiver station is input, and a network connection request is transmitted to a base station controller via the public networks. Upon receipt of the network connection request, the base station controller gives an instruction to the mobile station via the radio base transceiver station to report the use state of the downlink.

The mobile station that has received the instruction investigates the use state of the downlink, and makes a report to the base station controller via the radio base transceiver station.

The base station controller decides the information on the used channel and used spreading codes corresponding to the data set stored in the home radio base transceiver station, based upon the reported content. The base station controller sets the data set at the home radio base transceiver station to complete the network connection of the home radio base transceiver station.

By employing the above-mentioned method, it is made possible to automatically connect the home radio base transceiver station. Simultaneously, there can be an advantage that the use of a receiver equipped in the mobile station eliminates the necessity of especially equipping the receiver for monitoring the downlink in the home radio base transceiver station.

Patent Document 1: JP 2006-324831 A (Abstract, Paragraph 0015)

Non-Patent Document 1: 3GPP TSG RAN #35 RP-070209 Lemesos, Cyprus, 6-9 March 2007 (http://www.3gpp.org/ftp/tsg_ran/TSG_RAN/TSGR_35/Docs/)

DISCLOSURE OF THE INVENTION

As described above, Patent Document 1 discloses the automation technique of connecting the home base transceiver station (small-sized radio base transceiver station), as described in Non-Patent Document 1.

It should be noted that, however, in connecting the radio base transceiver station to the network, it is necessary to ensure not only the convenience enabled by automating the operations therefor but also the security relating to transmission and reception of information. This is enabled by establishing the preventive measures against unauthorized operations of any malicious communications operator who spoofs a valid user and operates the radio base transceiver station, conducts the operations that are allowed only for people who have a certain authority, or makes alternation or falsification of data flowing through information transmission paths.

It should be noted that, however, the above-mentioned documents do not pay attention to this issue and do not discuss this issue especially as a technical problem.

The present invention has been made in view of the above circumstances and has an object to provide a radio base transceiver station and a method of connecting the same to a network, whereby the operations for connecting a radio base transceiver station to a network are automated and the security in the transmission and reception of information by use of the radio base transceiver station that is connected to the network is ensured.

To solve the above problem, the following techniques are proposed according to the present invention.

(1) There is provided a radio base transceiver station operable in a network that is not under control of a mobile communications operator, the radio base transceiver station comprising: a mobile communications operator identifying section that identifies whether or not a mobile communications operator that is a communication target of the radio base transceiver station is a authorized mobile communications operator that complies with given regulations a VPN (Virtual Private Network) setting section that sets up a VPN between the radio base transceiver station and a network of the authorized mobile communications operator identified by the mobile communications operator identifying section; an installation location recognizing section that recognizes an installation location of the radio base transceiver station; a surrounding environment recognizing section that recognizes a surrounding environment of the radio base transceiver station; a recognition result notifying section that notifies a result recognized by the installation location recognizing section and a result recognized by the surrounding environment recognizing section via the VPN to the network of the authorized mobile communications operator; and a connection setting section that connects the radio base transceiver station to an upper node and sets up an operation parameter based upon given configuration data generated on the network side of the authorized mobile communications operator in accordance with the recognized results notified by the recognition result notifying section and supplied via the VPN to the radio base transceiver station.

The radio base transceiver station described in the above (1) is a radio base transceiver station operable in a network that is not under control of a mobile communications operator, the mobile communications operator identifying section identifies whether or not a mobile communications operator that is a communication target of the radio base transceiver station is an authorized mobile communications operator that complies with a given agreement.

The VPN (Virtual Private Network) setting section sets up a VPN between the radio base transceiver station and a network of the authorized mobile communications operator identified by the mobile communications operator identifying section.

Meanwhile, the installation location recognizing section recognizes an installation location of the radio base transceiver station and the surrounding environment recognizing section recognizes a surrounding environment of the radio base transceiver station.

The recognition result notifying section notifies a result recognized by the installation location recognizing section and a result recognized by the surrounding environment recognizing section via the VPN to the network of the authorized mobile communications operator.

The connection setting section connects the radio base transceiver station to an upper node and sets up an operation parameter based upon given configuration data generated on the network side of the authorized mobile communications operator in accordance with the recognized results notified by the recognition result notifying section and supplied via the VPN to the radio base transceiver station.

As described above, the connection of the above radio base transceiver station to the network is established.

(2) In the above radio base transceiver station of (1), in particular, the mobile communications operator identifying section identifies based upon at least one of a combination of a password and an ID, a digital certificate, an ID stored in a SIM (Subscriber Identity Module) card, and the installation location recognized by the installation location recognizing section.

In the above radio base transceiver station of (2), it is possible to identify the authorized mobile communications operator with certainty relying on acquirable information by use of technologies including, for example, a combination of a password and an ID, a digital certificate, an ID stored in a SIM (Subscriber Identity Module) card, or the installation location recognized by the installation location recognizing section. Each of the technologies has already been enabled and is developed.

(3) In the above radio base transceiver station of (1) or (2), in particular, the VPN setting section sets up the VPN between the radio base transceiver station and an SGW (Secure Gate Way) installed in the network of the authorized mobile communications operator by use of a VPN technology of IP sec (IP security protocol), SSL (Secure Socket Layer), or SoftEther (Registered trademark).

In the above radio base transceiver station of (3), safe and secure services are made possible in light of security. This is because the VPN settings are accomplished between the radio base transceiver station and an SGW (Secure Gate Way) installed in the network of the authorized mobile communications operator by use of a VPN technology of IP sec (IP security protocol), SSL (Secure Socket Layer), or SoftEther.

(4) In the above radio base transceiver station of any one of (1) to (3), in particular, the installation location recognizing section recognizes the installation location based upon location information of GPS.

In the above radio base transceiver station of (4), it is possible to recognize the installation location of the radio base transceiver station with certainty relying on the technology of acquiring the location information with the use of GPS which has been enabled and its applied fields are being expanding.

(5) In the above radio base transceiver station of any one of (1) to (3), in particular, the installation location recognizing section recognizes the installation location based upon information that represents a cell identifier acquired from a neighboring radio base transceiver station.

In the above radio base transceiver station of (5), it is possible to recognize the installation location relying on the acquirable information from the corresponding functional part of an existing radio base transceiver station, such as the information representing a cell identifier that has been acquired from a neighboring radio base transceiver station.

(6) In the above radio base transceiver station of any one of (1) to (5), in particular, the surrounding environment recognizing section acquires code information, frequency information, timing information for communication of a neighboring cell of the radio base transceiver station, on receipt of a downlink common control signal.

In the above radio base transceiver station of (6), it is possible to acquire and recognize code information, frequency information, timing information for communication of a neighboring cell of the radio base transceiver station, in an appropriate manner, relying on an acquirable signal (information) such as a downlink common control signal, as in an existing mobile station.

(7) In the above radio base transceiver station of any one of (1) to (5), in particular, the surrounding environment recognizing section acquires code information, frequency information, timing information for communication of a neighboring cell of the radio base transceiver station from the upper node that has received a measuring result of a downlink common control signal from a mobile station that stays within a cell of the radio base transceiver station.

In the above radio base transceiver station of (7), it is possible to acquire, in an appropriate manner, code information, frequency information, timing information for communication of a neighboring cell of the radio base transceiver station from the upper node that has received a measuring result of a downlink common control signal from a mobile station that stays within a cell of the radio base transceiver station.

(8) There is provided a method of connecting a radio base transceiver station operable in a network that is not under control of a mobile communications operator, the method comprising: identifying whether or not a mobile communications operator that is a communication target of the radio base transceiver station is an authorized mobile communications operator that complies with a given agreement; setting up a VPN (Virtual Private Network) between the radio base transceiver station and a network of the authorized mobile communications operator identified in the identifying; recognizing an installation location of the radio base transceiver station; recognizing a surrounding environment of the radio base transceiver station; notifying a result recognized in the recognizing the installation location and a result recognized in the recognizing the surrounding environment via the VPN to the network of the authorized mobile communications operator; and connecting the radio base transceiver station to an upper node and setting up an operation parameter based upon given configuration data generated on the network side of the authorized mobile communications operator in accordance with the recognized results notified in the notifying and supplied via the VPN to the radio base transceiver station.

In the above radio base transceiver station of (8), in the step of identifying the mobile communications operator, it is identified whether or not a mobile communications operator that is a communication target of the radio base transceiver station is an authorized mobile communications operator that complies with a given agreement.

Subsequently, in the VPN setting step, the VPN (Virtual Private Network) is set up between the radio base transceiver station and a network of the authorized mobile communications operator identified in the step of identifying the mobile communications operator.

In addition, in the step of recognizing the installation location, an installation location of the radio base transceiver station is recognized.

Furthermore, in the step of recognizing the surrounding environment, a surrounding environment of the radio base transceiver station; is recognized.

Then, in the step of notifying the recognition result, a result recognized in the recognizing the installation location and a result recognized in the recognizing the surrounding environment are notified via the VPN to the network of the authorized mobile communications operator.

Moreover, in the step of setting data configuration, the radio base transceiver station is connected to an upper node and an operation parameter is set up based upon given configuration data generated on the network side of the authorized mobile communications operator in accordance with the recognized results notified in the notifying and supplied via the VPN to the radio base transceiver station.

As described above, the connection of the above radio base transceiver station to the network is established.

According to the present invention, a radio base transceiver station and a method of connecting the radio base transceiver station to a network are enabled, whereby the operations for connecting the radio base transceiver station to a network are automated and the security in the reception of information by use of the radio base transceiver station that is connected to the network is ensured.

BEST MODE FOR CARRYING OUT THE INVENTION

Hereinafter, embodiments of the present invention will be discussed in detail with reference to the drawings.
(Inventive Concept of Radio Communication System including a Radio Base Transceiver Station)

Figure 1:
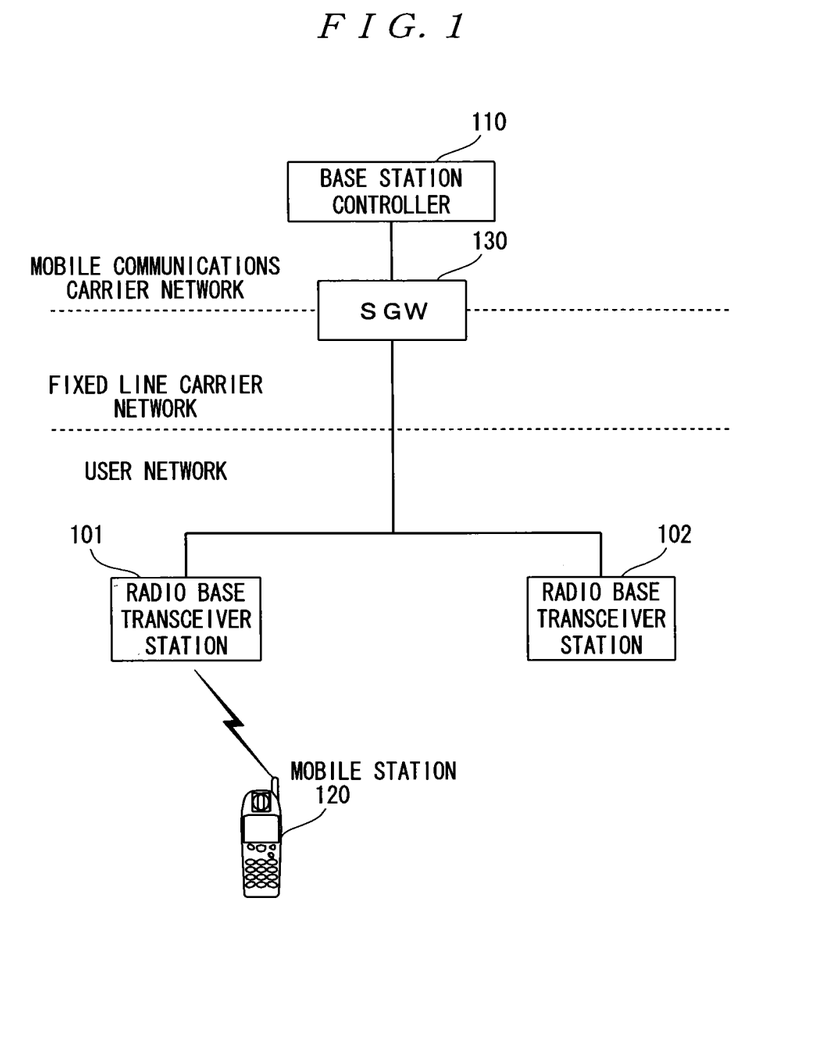
FIG. 1 is a schematic view of a radio communication system including a radio base transceiver station according to the present invention.

FIG. 1 is a schematic view of a radio communication system including a radio base transceiver station according to the present invention.

In the state of FIG. 1, a radio base transceiver station 101 and a radio base transceiver station 102 are arranged under control of a base station controller 110, according to an embodiment of the present invention.

The base station controller 110 assigns and manages a radio channel individually to the radio base transceiver stations 101 and 102 for radio communication between the radio base transceiver stations 101 and 102, and a mobile station 120, respectively.

Specifically, the radio base transceiver stations 101 and 102 are not arranged under control of a mobile communications operator that is the administrator of the base station controller 110, but is arranged under control of a user who makes a specific service subscription contract to subscribe the services of the mobile communications operator.

An example is that the radio base transceiver stations 101 and 102 are installed in a LAN (Local Area Network) managed by the above-described user, and is connected to the base station controller 110 in a LAN managed by the mobile communications operator providing broadband Internet connection services by means of ADSL (Asymmetric Digital Subscriber Line) or FTTH (Fiber To The Home).

Meanwhile, an SGW (Security Gateway) 130 is installed at the boundary of the LAN managed by the above-described mobile communications operator. The SGW 130 is a gateway for protecting the LAN managed by the above-described mobile communications operator from any unauthorized access from another network. The SGW 130 permits accesses to the LAN, only for the accesses recognized as valid by the authentication procedure of the SGW 130.
(Configuration and Effects of the Radio Base Transceiver Station According to the Present Invention)

Figure 2:
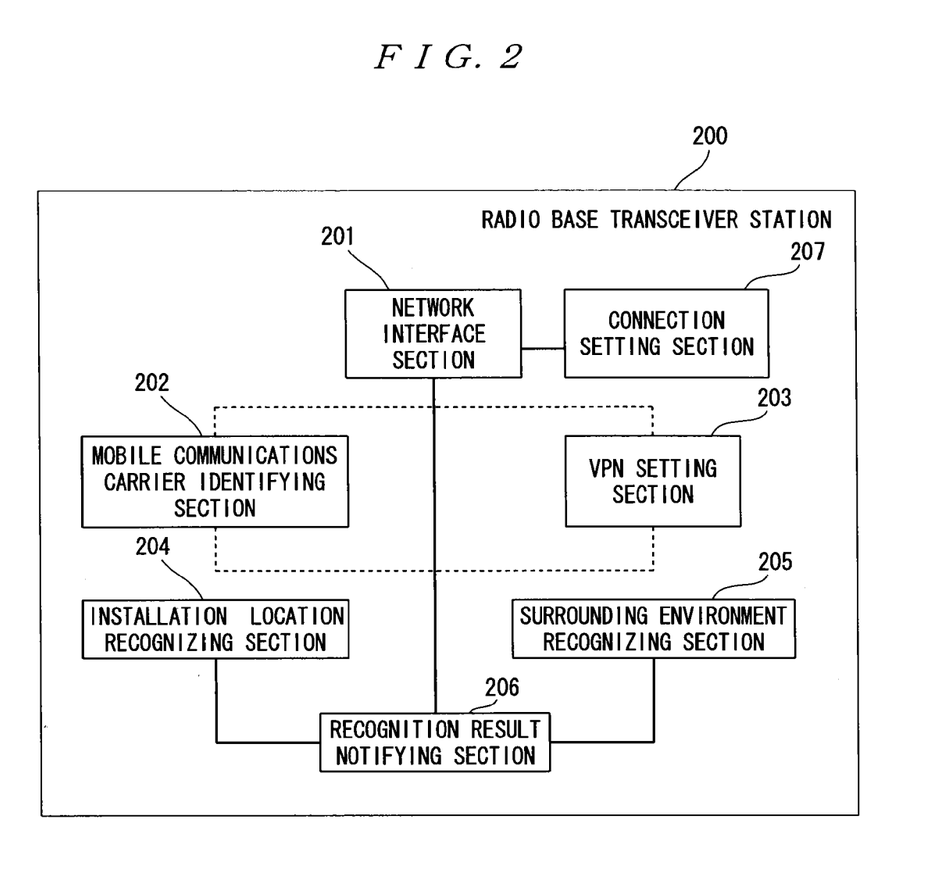
FIG. 2 is a block diagram illustrative of a configuration of the radio base transceiver station according to the present invention.

FIG. 2 is a block diagram illustrative of a configuration of the radio base transceiver station according to the present invention.

The radio base transceiver station of FIG. 2 has the same configuration as that of the radio base transceiver station 101 in FIG. 1. However, in FIG. 2, the reference numeral 200 is given to the radio base transceiver station.

The radio base transceiver station 200 includes: as illustrated, a network interface section 201; a mobile communications operator identifying section 202; a VPN setting section 203; an installation location recognizing section 204; a surrounding environment recognizing section 205; a recognition result notifying section 206; and a connection setting section 207.

The network interface section 201 transmits and receives various types of information to and from networks managed by a mobile communications operator.

The mobile communications operator identifying section 202 identifies whether or not the mobile communications operator that is a connection target of the radio base transceiver station 200 complies with given agreements.

Herein, the authorized mobile communications operator identified by the mobile communications operator identifying section 202 is an operator that has established a specific contract relationship with a person who is trying to install a private radio base transceiver station.

The mobile communications operator identifying section 202 is capable of identifying with certainty the authorized mobile communications operator depending on information that can be acquired by applying the technologies, such as, for example, a combination of a password and an ID, digital certificate, ID stored in a SIM (Subscriber Identity Module) card, or the installation location recognized by the installation location recognizing section, each of which has already been enabled and are being developed.

In the case of the combination of a password and an ID or the digital certificate as described above, the following two methods are conceivable.

That is, in the first method, a system is established such that the mobile communications operator loads and sets data for identification beforehand at the radio base transceiver station so that users are able to purchase such processed radio base transceiver stations.

In the second method, a system is established such that when a user who purchased the radio base transceiver station brings the radio base transceiver station to a given sales office or the like under control of the mobile communications operator, the mobile communications operator or the person who has the authority under control of the mobile communications operator conducts setting services relating to the above-described identification.

In addition, in the method of using the SIM card as described above, a system is established such that, for example, the mobile communications operator issues a SIM card so that a user purchases the SIM card and is then permitted to insert the SIM card into the radio base transceiver station. In this case, the mobile communications operator conducts given setting processes for information on authentication in the SIM card, before the SIM card is issued.

Furthermore, in the above-described method depending on the installation location, for example, an agreement is made such that before a user installs the radio base transceiver station, its installation location is reported to the mobile communications operator. The identification of a valid user and an authorized mobile communications operator is conducted based upon the consistency of the installation location of the radio base transceiver station that has been reported beforehand in accordance with the agreement and the installation location that has been recognized by installation location recognizing section.

Meanwhile, the VPN setting section 203 sets up a VPN (Virtual Private Network) with the authorized mobile communications operator that has been identified by the mobile communications operator identifying section 202.

In FIG. 2, the relationship between the mobile communications operator identifying section 202 and the VPN setting section 203 that work in cooperation with each other is conceptually indicated by dotted lines.

The VPN setting section 203 performs the VPN settings between, for example, the radio base transceiver station 200 and the SGW 130 installed in the network of a mobile communications operator, by applying the VPN technologies such as IPsec (IP security protocol), SSL (Secure Socket Layer), SoftEther, and the like, thereby enabling safe and secure services in light of security.

Specifically, the above IPsec, SSL, and SoftEther are merely described as an example. In addition to them, there are various VPN technologies, and any one of them is selectively applicable.

In addition, the installation location recognizing section 204 recognizes the installation location of the radio base transceiver station 200, whereas the surrounding environment recognizing section 205 recognizes the surrounding environments of the radio base transceiver station 200.

The installation location recognizing section 204 can be configured such that the installation location of the radio base transceiver station 200 is recognized with certainty, relying on, for example, the technology that acquires the location information by means of GPS, and that has already been enabled and is expanding its application fields.

Alternatively, the installation location recognizing section 204 can be configured such that the installation location is recognized relying on information that can be acquired from a corresponding functional part in an existing radio base transceiver station and that represents a cell identifier acquired from a neighboring radio base transceiver station (an example is the radio base transceiver station 102 that is viewed from the radio base transceiver station 101 and that corresponds to the radio base transceiver station 200).

Any one of the installation location recognizing section 204 that can be configured as described above is capable of recognizing the location of the base transceiver station with sufficient accuracy to provide a basis for determining the current location of a mobile station.

Additionally, according to the present invention, in particular, the above installation location recognizing section 204 plays an important role.

That is to say, in general, in order to recognize the location of a mobile station, it is an essential requirement for a mobile communications operator to know the location of a radio base transceiver station correctly. However, there is a problem in that it is impossible for the mobile communications operator to recognize the locations of private radio communication devices, which have been described in the present invention and which are not managed by the mobile communications operator at ordinary times (the location of the radio base transceiver station seems uncertain to the mobile communications operator).

For this reason, according to the present invention, the radio base transceiver station is provided with the above-described installation location recognizing section 204, so that the radio base transceiver station recognizes its own location correctly and information based upon the reorganization is supplied to the mobile communications operator. Accordingly, the problem that the location of the radio base transceiver station is uncertain is adequately addressed, and an issue occurring when the connection of the radio base transceiver station to the network is automated is overcome.

Meanwhile, the surrounding environment recognizing section 205 is provided for recognizing the surrounding environments of the radio base transceiver station 200, and is configured as follows.

That is, the surrounding environment recognizing section 205 can be configured to acquire and recognize, in an appropriate manner, code information (spreading code information) of a downlink common control signal in a neighboring cell of the radio base transceiver station 200, frequency information, and timing information on communication, the code information being an acquirable signal (information) in the same manner as in an existing mobile station, such as a downlink common control signal.

Alternatively, the surrounding environment recognizing section 205 can be configured to acquire and recognize, in an appropriate manner, code information (spreading code information) of a neighboring cell of the radio base transceiver station 200, frequency information, and timing information on communication from an upper node that has received the measurement report of the downlink common control signal from the mobile station (the mobile station 120 of FIG. 1) existing within the service area of the radio base transceiver station 200.

Herein, the upper node may be any node as far as it is included in the network of the authorized mobile communications operator. For example, the upper node may be the base station controller or a specifically arranged node.

The recognition result notifying section 206 notifies the information representing the installation location and the surrounding environment that have been recognized, as described, by the installation location recognizing section 204 and the surrounding environment recognizing section 205, respectively, to the network of the authorized mobile communications operator via the above-described VPN.

The connection setting section 207 performs the connection to an upper node and the settings for operation parameters, based upon given configuration data that has been generated on the network side of the authorized mobile communications operator and supplied in accordance with the information notified via the VPN and that has been supplied via the VPN. This establishes the connection of the radio base transceiver station 200 to the network.

Incidentally, the generation of the above configuration data on the network side is achieved by, for example, people of maintenance (mobile communications operator) conducting an area simulation or radio wave measurements to collect the information on the surrounding environments and manually inputting the information together with the information on the installation location of the radio base transceiver station into a given configuration data generator, so that the configuration data can be generated.

(Sequence of Method for Connecting Radio Base Transceiver Station According to the Present Invention to the Network)

Figure 3:
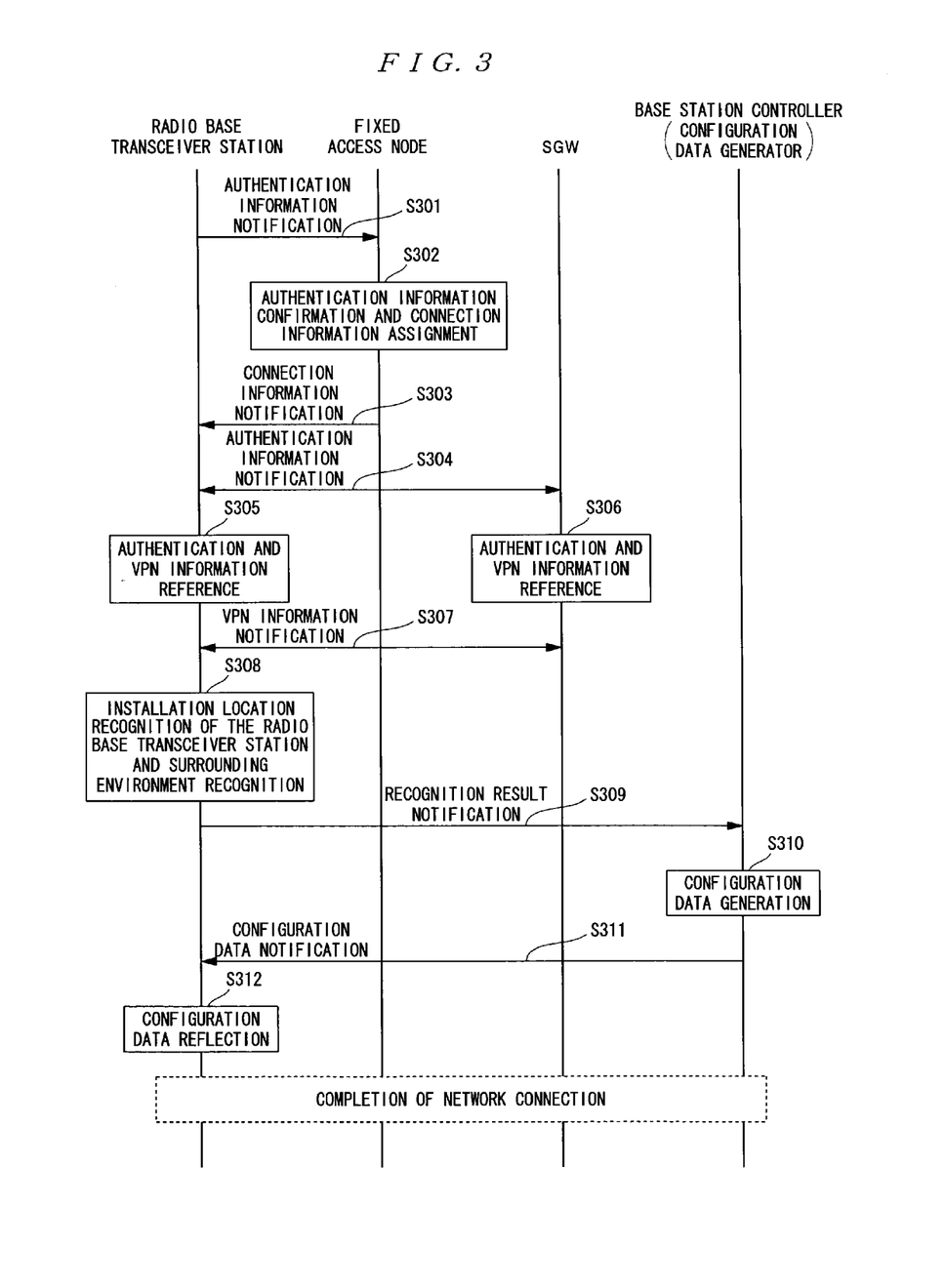
FIG. 3 is a sequential diagram for describing the procedure of connecting the radio base transceiver station according to the present invention to a network.

FIG. 3 is a sequential diagram for describing the procedure of connecting the radio base transceiver station according to the present invention to a network.

Firstly, the radio base transceiver station 101 (200) is connected to a node managed by a fixed access operator that provides the broadband Internet connection services by means of ADSL (Asymmetric Digital Subscriber Line) or FTTH (Fiber To The Home), in order to be connected to the network of the mobile communications operator.

As a general example, the node is a BAS (Broadband Access Server) that is a terminal end of PPPoE (Point-to-Point Protocol over Ethernet (registered trademark)) to be used, when the above-described fixed access operator assigns to their users connection information of an IP address or the like.

Authentication information (ID and password) necessary for the PPPoE authentication is set up beforehand in the radio base transceiver station 101, and the authentication information is notified to the BAS (as represented by "fixed access node" in FIG. 3) (step S301).

The fixed access node (BAS) that has received the authentication information confirms whether or not the authentication information notified at step S301 is valid. If it is valid, the fixed access node (BAS) assigns the connection information of an IP address or the like to be assigned to the radio base transceiver station 101 (step S302). Then, the connection information is notified to the radio base transceiver station 101 (step S303).

By completing the operations to step S303, the radio base transceiver station 101 is capable of accessing an external network that has a global IP address.

Subsequently, the SGW (Security Gateway) 130 that is a gateway of the network of the mobile communications operator is connected. The SGW 130 is the gateway to protect the LAN managed by the above-described mobile communications operator from an unauthorized access from another network, and conducts a give authentication procedure with the radio base transceiver station 101 and the VPN settings.

In this case, authentication information necessary for the VPN settings is set beforehand in the radio base transceiver station 101. Specifically, in a case where the VPN settings are achieved by IPsec (IP security protocol), a pre-shared key corresponds to the authentication information.

The radio base transceiver station 101 and the SGW 130 notify the authentication information respectively owned by themselves (step S304), and authenticate whether or not each of them is valid relying on the notification (step S305, step S306).

In this embodiment, the authentication process is conducted with each other as step S305 and step S306. Accordingly, also for the mobile communications operator, it is possible to limit the allowable connection to the network managed and controlled by the mobile communications operator to only normal radio base transceiver stations.

Accordingly, in this embodiment, it is possible to detect the installation of an unauthorized radio base transceiver station or spoofing of an unauthorized mobile communications operator from both sides of (private) radio base transceiver station and a mobile communications operator with each other. Therefore, high-security services can be provided.

If the radio base transceiver station 101 and the SGW 130 are determined to be valid with each other in the authentication procedure at step S305 and step S306, the VPN settings are conducted between the radio base transceiver station 101 and the SGW 130 (step S307: represented by "VPN information notification").

Generally, since data transmitted over the VPN is encrypted, the possibility that the data is sniffed by a third party is extremely low. Even if a third party tampers with data, the receiving side is not capable of detecting the tampered data by use of an error detecting function of the VPN technology.

Accordingly, even if the data communicated between the radio base transceiver station according to the present invention and the network of the mobile communications operator is tampered with by a third party, the control between the radio base transceiver station according to the present invention and the network of the mobile communications operator cannot be conducted. The control is enabled based upon only the data that has not been tampered with.

Meanwhile, the radio base transceiver station 101 recognizes the installation location and the surrounding environments of the radio base transceiver station 101 (step S308), and notifies the recognition result to the base station controller 110 (including a functional part as a configuration data generator that generates the configuration data) via the VPN set up at step S307.

As described above, as a method of recognizing the installation location, for instance, a method of utilizing GPS or a method of collecting the location information notified to a neighboring base station and estimating the installation location of the radio base transceiver station is applicable.

In addition, as a method of recognizing the surrounding environments, for instance, a method of receiving a common control channel notified to a neighboring radio base transceiver station and recognizing information of the base transceiver station located as a neighbor of the above neighboring base transceiver station is applicable.

In the present example, after the VPN settings (VPN information notification) at step S307, the installation location and surrounding environments of the radio base transceiver station 101 are recognized (step S308). However, the installation location or surrounding environments of the radio base transceiver station 101 (step S308) may be recognized at any time as far as it is prior to the recognition result notification (step S309).

The base station controller 110 (configuration data generator) that has received the recognition result by means of the recognition result notification at step S309 generates the configuration data that is an aggregation of parameters necessary for the connection of the radio base transceiver station 101 to the network, based upon the recognition result (step S310), and notifies the configuration data to the radio base transceiver station 101 (step S311).

The configuration data generated at step S310 is acquired by calculating the frequency information, code information, and timing information, for the radio base transceiver station 101 to conduct radio transmission, and in addition, a neighboring cell list necessary for enabling handover of the mobile station 120 between the radio base transceiver station 101 and a neighboring radio base transceiver station (102), installation location information necessary for estimating the location information of the mobile station 120, and the like, based upon the above-described recognition result.

As described heretofore, the radio base transceiver station 101 reflects the configuration data that has been notified as described above on the radio base transceiver station 101 (step S312), thereby establishing the connection of the radio base transceiver station 101 to the network.

INDUSTRIAL APPLICABILITY

A radio base transceiver station according to the present invention is embodied as, for example, an extremely small-sized base transceiver station and is sold and used for a user as well as for an access point of a wireless LAN to be connected to an access line (FTTH, ADSL) in each house (or each room of the house) or to a commercial power supply.

As compared to the general radio base transceiver station for public use, the initial costs of the mobile communications operator can be suppressed low, whereby there is a possibility of providing a service of giving a discount on the communication fee under control of a home base transceiver station.

The invention claimed is:

1. A radio base transceiver station operable in a network that is not under control of a mobile communications operator, the radio base transceiver station comprising:
a mobile communications operator identifying section that identifies whether or not a mobile communications operator that is a communication target of the radio base transceiver station is an authorized mobile communications operator that complies with a given agreement;
a VPN (Virtual Private Network) setting section that sets up a VPN between the radio base transceiver station and a network of the authorized mobile communications operator identified by the mobile communications operator identifying section;
an installation location recognizing section that recognizes an installation location of the radio base transceiver station;
a surrounding environment recognizing section that recognizes a surrounding environment of the radio base transceiver station and acquires code information, frequency information, timing information for communication of a neighboring cell of the radio base transceiver station from an upper node that has received a measuring result of a downlink common control signal from a mobile station that stays within a cell of the radio base transceiver station;
a recognition result notifying section that notifies both of a result recognized by the installation location recognizing section and a result recognized by the surrounding environment recognizing section via the VPN set up by the VPN setting section to the network of the authorized mobile communications operator; and
a connection setting section that receives configuration data generated by the authorized mobile communications operator via the VPN set up by the VPN setting section, after the recognition result notifying section notifies the both of the result recognized by the installation location recognizing section and the result recognized by the surrounding environment recognizing section to the network of the authorized mobile communications operator via the VPN set up by the VPN setting section, the configuration data being an aggregation of parameters necessary for connection of the radio base transceiver station to the network of the authorized mobile communications operator to perform connection of the radio base transceiver station to the network of the authorized mobile communications operator and perform parameter settings based upon the received configuration data.

2. The radio base transceiver station according to claim 1, wherein the mobile communications operator identifying section identifies the authorized mobile communications operator based upon at least one of a combination of a password and an ID, a digital certificate, an ID stored in a SIM (Subscriber Identity Module) card, and the installation location recognized by the installation location recognizing section.

3. The radio base transceiver station according to claim 1, wherein the VPN setting section sets up the VPN between the radio base transceiver station and an SGW (Secure Gate Way) installed in the network of the authorized mobile communications operator by use of a VPN technology.

4. The radio base transceiver station according to claim 1, wherein the installation location recognizing section recognizes the installation location based upon location information of GPS (Global Positioning System).

5. The radio base transceiver station according to claim 1, wherein the installation location recognizing section recognizes the installation location based upon information that represents a cell identifier acquired from a neighboring radio base transceiver station.

6. A method of connecting a radio base transceiver station operable in a network that is not under control of a mobile communications operator, the method comprising:
identifying whether or not a mobile communications operator that is a communication target of the radio base transceiver station is an authorized mobile communications operator that complies with a given agreement;

setting up a VPN (Virtual Private Network) between the radio base transceiver station and a network of the authorized mobile communications operator identified in the identifying;

recognizing an installation location of the radio base transceiver station;

recognizing a surrounding environment of the radio base transceiver station and acquiring code information, frequency information, timing information for communication of a neighboring cell of the radio base transceiver station from an upper node that has received a measuring result of a downlink common control signal from a mobile station that stays within a cell of the radio base transceiver station;

notifying both of a result recognized in the recognizing the installation location and a result recognized in the recognizing the surrounding environment via the VPN set up in the setting up the VPN to the network of the authorized mobile communications operator;

receiving configuration data generated by the authorized mobile communications operator via the VPN set up in the setting up the VPN, after the notifying notifies the both of the installation location recognized by the recognizing the installation location and the surrounding environment recognized by the recognizing the surrounding environment to the network of the authorized mobile communications operator via the VPN set up in the setting up the VPN, the configuration data being an aggregation of parameters necessary for connection of the radio base transceiver station to the network of the authorized mobile communications operator; and connecting the radio base transceiver station to the network of the authorized mobile communications operator and performing parameter settings based upon the received configuration data.

\* \* \* \* \*